US011469068B1

(12) United States Patent
Fasano (10) Patent No.: US 11,469,068 B1
(45) Date of Patent: Oct. 11, 2022

(54) DIN RAIL ATTACHMENT FOR CIRCUIT INTERRUPTER

(71) Applicant: Carling Technologies, Inc., Plainville, CT (US)

(72) Inventor: Michael Fasano, Watertown, CT (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 17/241,533

(22) Filed: Apr. 27, 2021

(51) Int. Cl.
*H01H 71/08* (2006.01)
*H01H 71/12* (2006.01)
*H01H 71/02* (2006.01)
*H02B 1/052* (2006.01)
*H01R 9/26* (2006.01)

(52) U.S. Cl.
CPC ........ *H01H 71/08* (2013.01); *H01H 71/0228* (2013.01); *H01H 71/128* (2013.01); *H01R 9/2608* (2013.01); *H02B 1/052* (2013.01); *H02B 1/0523* (2013.01)

(58) Field of Classification Search
CPC .. H01H 71/08; H01H 71/0228; H01H 71/128; H05K 7/12; H05K 7/14; H05K 7/18; H05K 7/183; H05K 7/1474; H02B 1/052; H02B 1/0523; H01R 9/2608
See application file for complete search history.

(56) References Cited

U.S. PATENT DOCUMENTS

| | | | |
|---|---|---|---|
| 6,431,909 B1 * | 8/2002 | Nolden | H01R 9/2608 361/810 |
| 9,331,404 B2 * | 5/2016 | Devanand | H01R 9/2608 |
| 9,374,924 B2 | 6/2016 | Boretti | |
| 9,386,718 B2 | 7/2016 | Kusumi et al. | |
| 10,211,003 B1 | 2/2019 | Fasano | |

FOREIGN PATENT DOCUMENTS

EP 2259396 A2 * 12/2010 ............ H02B 1/052

* cited by examiner

*Primary Examiner* — Vanessa Girardi
(74) *Attorney, Agent, or Firm* — KDB Firm PLLC (57) ABSTRACT

A circuit interrupter adapted to be detachably connected to a rail system includes a housing having a notch disposed thereon adapted to receive a first leg of the rail system. An engagement member having a notch disposed therein adapted to receive a second leg of the rail system is slideably carried by the housing such that the notch in the engagement member is moveable in a first plane toward and away from the notch in the housing between an engaged position and a disengaged position. An actuation member is slideably carried by the housing and is moveable in a second plane, different than the first plane, between an actuated position and an unactuated position, movement of the actuation member in the second plane being translated into movement of the engagement member in the first plane.

19 Claims, 6 Drawing Sheets

DIN RAIL ATTACHMENT FOR CIRCUIT INTERRUPTER

FIELD OF THE INVENTION

The invention relates to the field of circuit interrupters. More specifically, the invention relates to a circuit interrupter having an improved system and method for the removeable securing thereof to a rail system, such as a DIN (Deutsches Institut far Normung) rail system.

BACKGROUND OF THE INVENTION

A large number of electrical and/or electronic devices, such as circuit interrupters (including circuit breakers) may be mounted on a rail system, such as a DIN rail. Use of a DIN rail makes possible a compact, organized arrangement of circuit interrupters and other DIN rail mounted components. Such an arrangement of mounting of the electrical/electronic devices onto a DIN rail not only gives the appearance of quality, but also saves time and space, enhances design capabilities and provides a centralized connect-disconnect area. At the same time, the DIN rail concept allows designers to take advantage of constant advances in circuit interrupter technology by facilitating the replaceability of aging technologies.

Typically, the electrical/electronic devices are provided with attaching arrangements for facilitating installation and removal of the electrical/electronic devices onto and off of the DIN rail without the need for specialized tools, and most preferably with no need for tools at all. One of the most basic and earliest ways that electrical/electronic devices were attached to DIN rails was simply the provision of two guide ways and two substantially planer semi-flexible tabs for facilitating mounting of the electrical/electronic devices onto the DIN rail via a snap-action connection. While this snap-action connection provided for detachable mounting on the DIN rail, it was not particularly secure, allowing for the device to become dislodged unintentionally. Moreover, such a snap-action design was prone to failure, since one or both of the semi-flexible tabs might break off during installation or removal.

Various connectors have been developed in the prior art subsequent to the early snap-action design for detachably mounting electrical/electronic devices onto a DIN rail. However, many of these previously known connectors are expensive and fail to adequately prevent unintended disengagement of the electrical/electronic devices from the DIN rail for various reasons. Additionally, many of the known DIN rail connectors are relatively complicated and employ a relatively large number of moving parts, including springs or the like, which makes them prone to failure. Moreover, many designs have no mechanism for latching the connector in both a locked and an unlocked position (i.e., previously known connectors are typically biased by a spring or the like to the locked position), which requires a user to engage an actuator button, slide or the like the entire time that the device is being installed and/or removed, thereby rendering installation and/or removal needlessly complicated, particularly for users lacking in manual dexterity and/or hand function. For example, it may be difficult for a user to maintain a spring-biased slide in a retracted position with his/her finger while at the same time trying to pry a circuit interrupter out of a panel, particularly if there are other circuit interrupters disposed on either side of the one being removed.

Accordingly, there is a need for an attachment arrangement that securely mounts electrical/electronic devices onto a DIN rail, while facilitating installation and intentional removal of the device from the DIN rail. Further, there is a need for an attachment arrangement that inhibits unintended disengagement of the device from the DIN rail. Still further, there is a need for an attachment arrangement for detachably mounting the electrical/electronic devices onto the DIN rail that is simple and convenient to use, and that employs a relatively small number of moving parts so as, consequently, to be less expensive, less prone to failure and require less maintenance than previously known designs.

SUMMARY OF THE INVENTION

To this end, a circuit interrupter adapted to be detachably connected to a rail system is provided, according to one aspect of the present invention, comprising a housing within which components of the circuit interrupter are disposed, the housing having a notch disposed thereon adapted to receive a first leg of the rail system. An engagement member having a notch disposed therein adapted to receive a second leg of the rail system is slideably carried by the housing such that the notch in the engagement member is moveable in a first plane toward and away from the notch in the housing between an engaged position wherein the notches in the engagement member and the housing are adapted to secure the rail system therebetween and a disengaged position, wherein the notch in the engagement member is moved away from the notch in the housing, such that the housing is adapted to be removeable from the rail system. An actuation member is slideably carried by the housing and is moveable in a second plane, different than the first plane, between an actuated position and an unactuated position, movement of the actuation member in the second plane being translated into movement of the engagement member in the first plane. When the actuation member is in the unactuated position, the engagement member is in the engaged position, and when the actuation member is moved to the actuated position, the engagement member correspondingly moves to the disengaged position.

In some embodiments, the actuation member comprises a ramp and the engagement member comprises a ramp, the ramps of the actuation member and the engagement member slideably engaging one another, and acting to translate movement of the actuation member in the second plane into movement of the engagement member in the first plane.

In some embodiments, the engagement member is biased toward the engaged position. In certain of these embodiments, the actuation member comprises at least one elastically deformable leg that is caused to deform when the actuation member is moved to the actuated position and the engagement member moves to the disengaged position, and the at least one elastically deformable leg biases the engagement member toward the engaged position.

In some embodiments, the housing comprises at least one recess and the engagement member comprises at least one detent, the at least one recess in the housing and the at least one detent on the engagement member cooperating when the engagement member is in the engaged position to urge the engagement member to remain in the engaged position.

In some embodiments, the housing defines channels therein for receiving the engagement member and the actuation member. In certain of these embodiments, when the engagement member is in the disengaged position, frictional forces between the channels and at least one of the engagement member and the actuation member urge the engagement member to remain in the disengaged position.

In some embodiments, the second plane is generally orthogonal to the first plane. In some embodiments, the rail system comprises a DIN rail.

In some embodiments, the circuit interrupter comprises a circuit breaker. In certain of these embodiments, the circuit breaker further comprises a resetting mechanism adapted to reset the circuit breaker when tripped, the resetting mechanism being accessible from a first side of the circuit breaker, the actuation member also being accessible from the first side of the circuit breaker.

In accordance with another aspect of the present invention, a circuit breaker comprises a housing within which components of the circuit breaker are disposed, an engagement member being slideably carried by the housing such that the engagement member is moveable in a first plane between an engaged position and a disengaged position, and an actuation member being slideably carried by the housing and being moveable in a second plane, generally orthogonal to the first plane, between an actuated position and an unactuated position. The actuation member comprises a ramp and the engagement member comprises a ramp, the ramps of the actuation member and the engagement member slideably engaging one another, and acting to translate movement of the actuation member in the second plane into movement of the engagement member in the first plane, such that when the actuation member is in the unactuated position, the engagement member is in the engaged position, and when the actuation member is moved to the actuated position, the engagement member correspondingly moves to the disengaged position.

In some embodiments, the housing has a notch disposed thereon and the engagement member has a notch disposed therein, the notch in the engagement member being positioned closer to the notch in the housing when the engagement member is in the engaged position than when the engagement member is in the disengaged position.

In some embodiments, the engagement member is biased toward the engaged position. In certain of these embodiments, the actuation member comprises at least one elastically deformable leg that is caused to deform when the actuation member is moved to the actuated position and the engagement member moves to the disengaged position, and wherein the at least one elastically deformable leg biases the engagement member toward the engaged position.

In some embodiments, the housing comprises at least one recess and the engagement member comprises at least one detent, the at least one recess in the housing and the at least one detent on the engagement member cooperating when the engagement member is in the engaged position to urge the engagement member to remain in the engaged position.

In some embodiments, the housing defines channels therein for receiving the engagement member and the actuation member. In certain of these embodiments, when the engagement member is in the disengaged position, frictional forces between the channels and at least one of the engagement member and the actuation member urge the engagement member to remain in the disengaged position.

In some embodiments, the circuit breaker is adapted to be detachably connected to a DIN rail. In some embodiments, the circuit breaker further comprises a resetting mechanism adapted to reset the circuit breaker when tripped, the resetting mechanism being accessible from a first side of the circuit breaker, the actuation member also being accessible from the first side of the circuit breaker.

The present invention thus provides a circuit interrupter having a DIN rail attachment arrangement that allows for secure mounting of electrical/electronic devices onto a DIN rail, while facilitating installation and intentional removal of the device from the DIN rail, that inhibits unintended disengagement of the device from the DIN rail, that is simple and convenient to use, and that employs a relatively small number of moving parts so as, consequently, to be less expensive, less prone to failure and require less maintenance than previously known designs.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
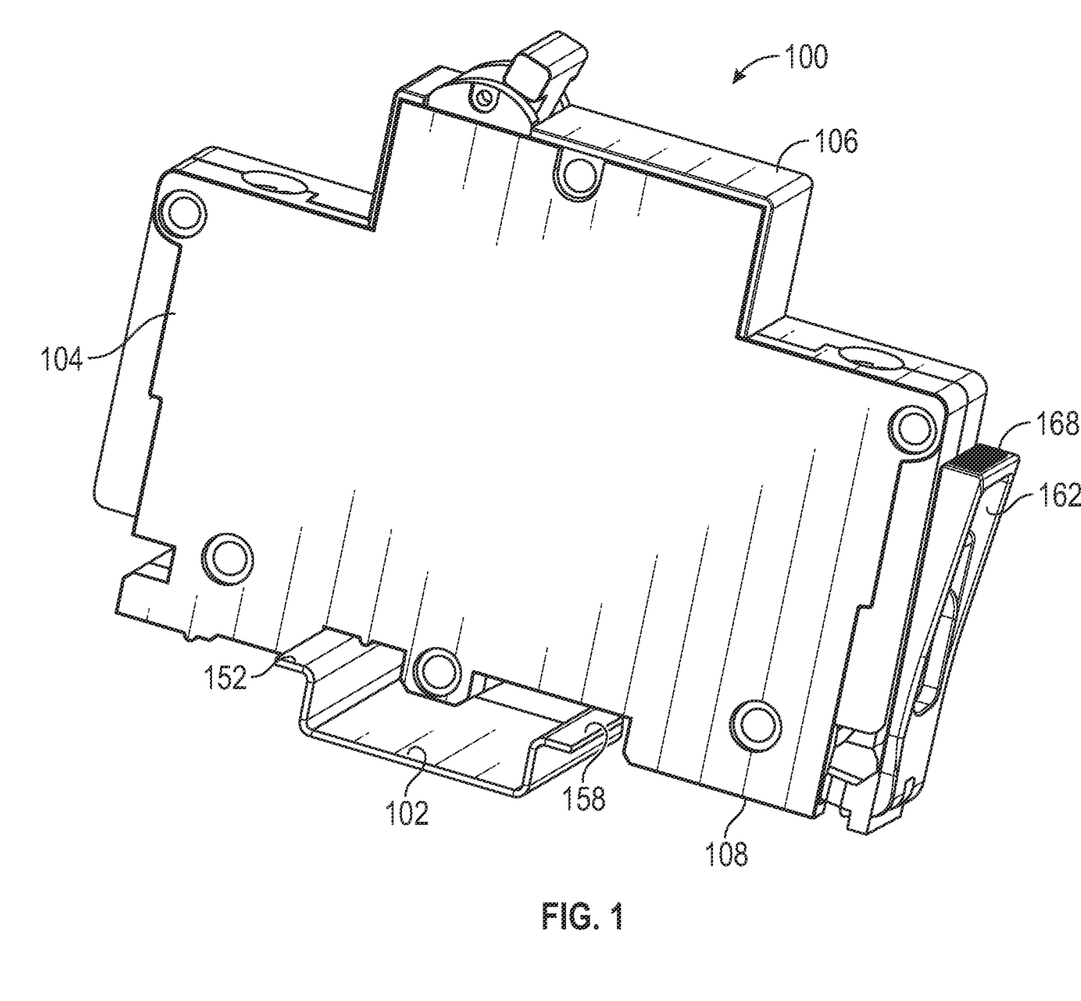
FIG. 1 is a side isometric view illustrating the outside housing of an exemplary circuit interrupter constructed in accordance with the present invention.

FIG. 1 illustrates the exterior of an example circuit interrupter, in this case a circuit breaker (100), adapted to be detachably connected to a rail system, in this case, a DIN (Deutsches Institut far Normung) rail (102). As the configuration of DIN rails (102) and their use in similar applications is extremely well-known, a detailed description thereof is not presented herein.

The circuit breaker (100) can take many forms, with it being understood that the illustrated embodiment is provided as an example only. As such, conventional components and/or components otherwise not particularly relevant to the inventive aspects hereof are only briefly described, or not described at all.

Figure 2:
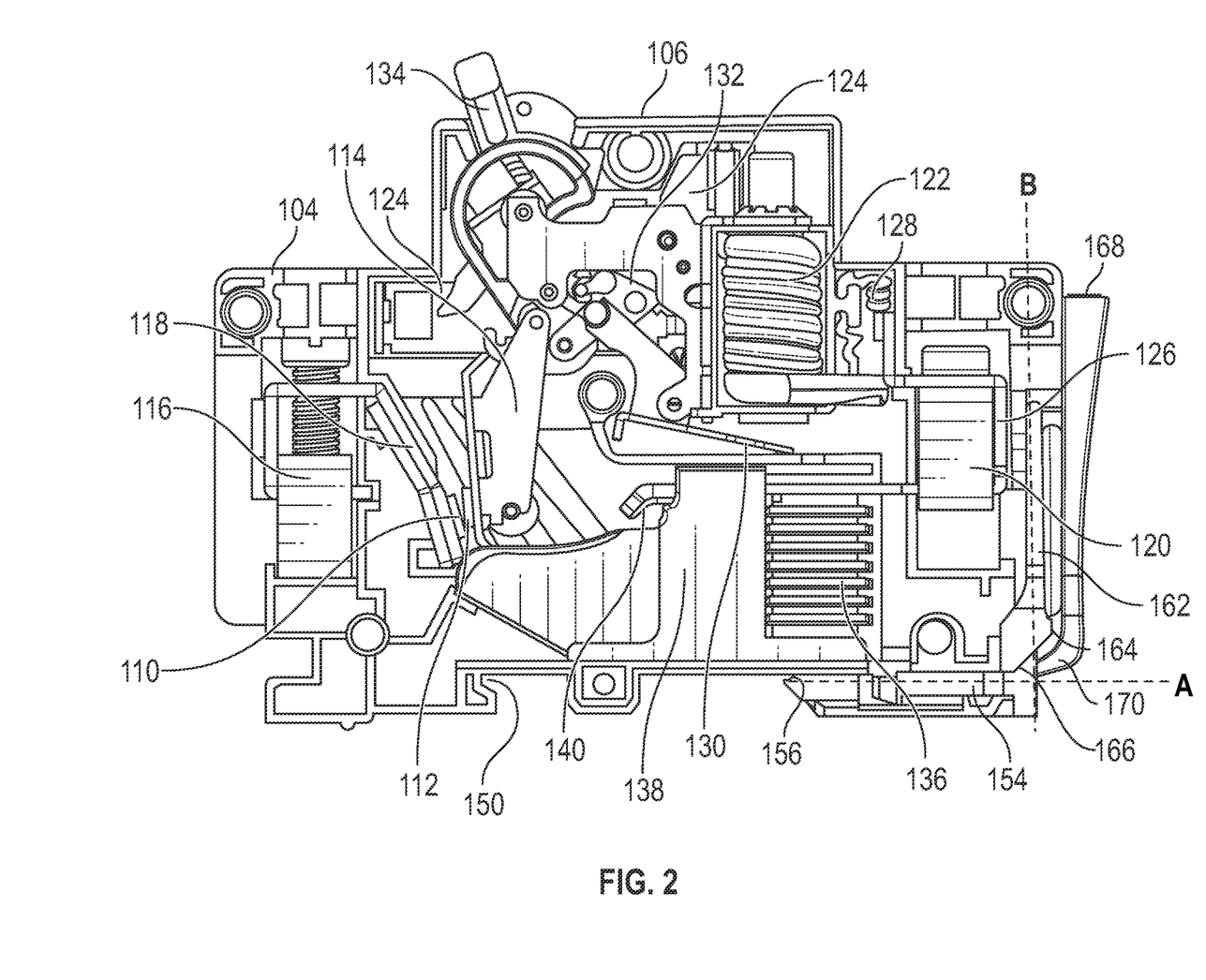
FIG. 2 is a side elevational view, partially broken away, of the exemplary circuit interrupter, in the form of a circuit breaker, constructed in accordance with the present invention as shown in FIG. 1.

With this caveat, and referring generally to FIGS. 1 and 2, the circuit breaker (100) is provided with a housing (104) that contains the working elements of the device therein. The housing (104) has an exposed outwardly facing surface (106), generally opposite to the side (108) of the housing (104) adapted to engage the DIN rail (102), that would remain visible to a user when the circuit breaker (100) is installed in a circuit breaker panel in a well-known manner.

The circuit breaker (100) is further generally provided with a set of contacts including a stationary contact (110) and a movable contact (112). The moveable contact (112) is positioned on a moveable contact arm assembly (114), and the moveable contact (112) is configured to move between an open and closed position relative to the stationary contact (110). FIG. 2 shows the contacts (110, 112) in the closed position where electrical current flows therebetween.

Also shown in FIG. 2 is a "line" terminal (116), which is designed to be connected to a source of electrical power (not shown). Stationary contact (110) is mounted onto a first conductive element (118), which in turn is electrically connected to line terminal (116).

Also provided is a "load" terminal (120), which is designed to be connected to the electrical components (not shown) being fed from the circuit breaker, such as an individual component connected directly to a circuit breaker (e.g., an air conditioner unit), or multiple components through a power wire which terminates at electrical outlets.

Moveable contact (112) mounted on moveable contact arm assembly (114) is in indirect electrical communication with the load terminal (120). More specifically, the moveable contact arm assembly (114), which is electrically conductive, is in electrical communication with an input side of an overcurrent tripping device (122) through a conductive connector (124) via a not shown flexible conductive element, such as a braided wire, connected on one end to the moveable contact arm assembly (114) and on the other end to the conductive connected (124) (as is conventional). An output side of the overcurrent tripping device (122) is in electrical communication with a second conductive element (126) through a conductive connector (128), with the load terminal (120) being in electrical communication with the second conductive element (126).

In operation, and when the circuit breaker (100) is in the "on" state (i.e., when the stationary contact (110) and the moveable contact (112) are closed and thereby in electrical communication), electrical power is input into circuit breaker (100) via line terminal (116) and exits the circuit breaker (100) via the load terminal (120). The flow of electricity through the circuit breaker will now be discussed.

Electrical power flows into the circuit breaker (100) through line terminal (116), and then passes through first conductive element (118) to stationary contact (110). The contacts being closed, the electrical power flows through moveable contact (112), through conductive contact arm assembly (114), through conductive connector (124) and to the input side of overcurrent tripping device (122). The electrical power then flows out the output side of the overcurrent tripping device (122) through conductive connector (128), through second conductive element (126), exiting the circuit breaker through load terminal (120).

If the electrical current exceeds a threshold level, overcurrent tripping device (122) will function to "trip" the circuit breaker (100) by opening the circuit, opening the contacts relative to each other by means of a trip mechanism (130) (i.e., armature) and linkage assembly (132) such that the flow of electrical current through the contacts (110,112) ceases. In the event that the electrical current does not exceed the threshold level set by overcurrent tripping device (122), the electrical power is allowed to pass through load terminal (120), which in turn, provides electrical power to the connected circuit and/or equipment.

The circuit breaker (100) also includes a resetting mechanism (134) adapted to reset the circuit breaker (100) and move the moveable contact (112) into physical contact with the stationary contact (110) by movement of the moveable contact arm assembly (110). The resetting mechanism (134) is connected to the linkage assembly (132), which in turn, is connected to the moveable contact arm assembly (114) for this purpose. The resetting mechanism (130) may also be used to manually open and close the contacts (110,112), i.e., to turn the circuit breaker (100) on and off, as is known in the art. In the exemplary embodiment shown, the resetting mechanism (134) takes the form of a handle-type actuator, discussed in further detail below.

Referring again specifically to FIG. 2, the circuit breaker (100) is shown in the "on" position, where the contacts (110,112) are closed. As is known, when the circuit breaker (100) is manually turned off or when an overcurrent situation is sensed, the contacts (110,112) are caused to open, to thereby cease the flow of electrical power through the circuit breaker (100). However, also as is known, although moveable contact (112) has separated from stationary contact (110), electricity, in the form of an arc (not shown) may still flow from electrical contact (110) to electrical contact (112) for a period of time. The arc may be capable of jumping between electrical contacts, through air, and can cause severe damage to both contacts (110,112).

In a worst case scenario, a single arc can damage the contacts so severely as to render them inoperable during normal operation. However, even when such is not the case, the arc may create heat, which may damage various components over time. To protect electrical contacts (110,112), and circuit breaker (100) overall, any created arc must be extinguished as quickly as possible. This may be done by pushing the arc into an arc splitter (136) disposed within an arc chamber (138).

The arc splitter (136) may take the form of a plurality of spaced apart, generally metallic, plates which draw the arc in, and cool and quench the arc. Each plate may be spaced apart at the same distance, or the distance between each plate may vary depending on the application of circuit breaker. For example, each plate may be spaced apart approximately 0.8 inches from the next plate, or the distance between each plate (may be varied. For example, the plates toward one side of the housing may be closer together than the plates towards the other side of the housing, or vice versa.

Additionally, one or more arc straps (140) may be provided in order to provide a safe place for the arc to jump prior to the arc being fully extinguished. In the shown example, arc strap (140) is in electrical communication with the load terminal (120), although an arc strap in communication with the line terminal may be provided instead of, or in addition to, the illustrated arc strap (140).

As briefly noted above, the housing (104) of the circuit breaker (100) includes an outwardly facing exposed surface (106) through which the resetting mechanism (134) extends and/or is accessible by a user. As will be understood by those skilled in the art, circuit breakers of the type discussed herein are configured to be inserted into panels with a plurality of other circuit breaker (at least some of which are typically identical to others). A typical home, for example, has at least one, and perhaps two, three or even more, such panels, each of which may include 10, 20 or even more circuit breakers. Also as is understood by those skilled in the art, generally only one surface of each of the circuit breakers (i.e., the one carrying the resetting mechanism) is exposed. This outwardly facing exposed surface (shown as 106 in FIG. 1) generally defines at least one plane. Typically, all of the circuit breakers disposed in each panel have their outwardly facing exposed surface lying in the same plane.

As noted previously, the present invention is particularly concerned with providing an improved system and method for the removeable securing of the circuit breaker (100) to a rail system, such as the DIN rail (102) illustrated in FIG. 1. Specific aspects of the exemplary embodiment for achieving such will now be discussed with reference to FIGS. 1-7.

Referring specifically to FIGS. 1 and 2, the housing (104) is provided with a notch (150) disposed thereon adapted to receive a first leg (152) of the DIN rail (102). An engagement member (154) is provided, also having a notch (156) disposed therein adapted to receive a second leg (158) of the DIN rail (102). The engagement member (154) is slideably carried by the housing (104) within a channel (160) provided therein (best seen in FIG. 5), such that the notch (156) in the engagement member (154) is moveable in a first plane (A) toward and away from the notch (150) in the housing (104) between an engaged position (shown in FIGS. 2 and 3) wherein the notches (150, 156) in the engagement member (154) and the housing (104) are adapted to secure the DIN rail (102) system therebetween and a disengaged position (shown in FIG. 4), wherein the notch (156) in the engagement member (154) is moved away from the notch (150) in the housing (104), such that the housing (104) is adapted to be removeable from the DIN rail (102).

Figure 3:
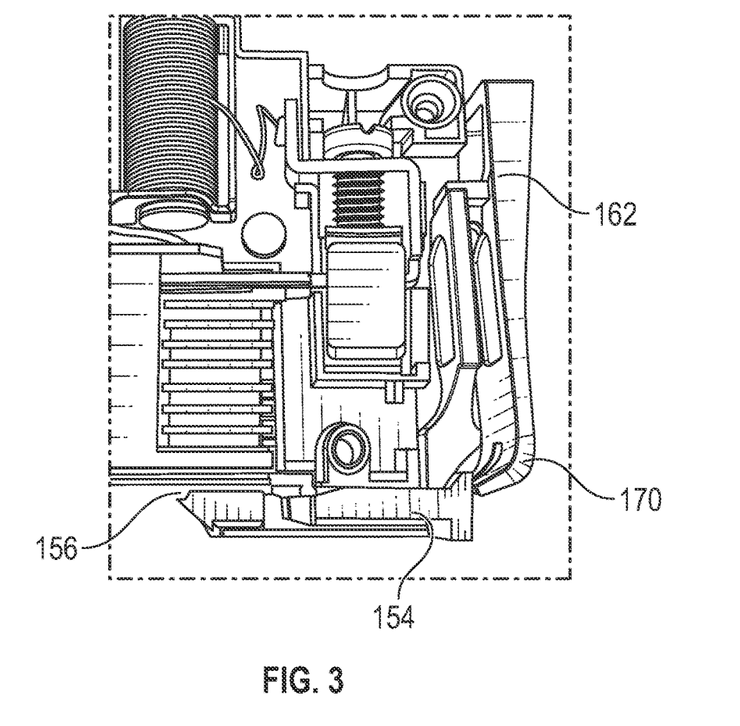
FIG. 3 is a side elevational view, partially broken away, of relevant portions of the circuit interrupter of FIGS. 1 and 2 shown in a DIN rail engaging position.

An actuation member (162) is slideably carried by the housing (104) within a channel (161) provided therein (best seen in FIG. 5) and is moveable in a second plane (B), different than the first plane, between an actuated position (shown in FIG. 4) and an unactuated position (shown in FIGS. 2 and 3).

Figure 4:
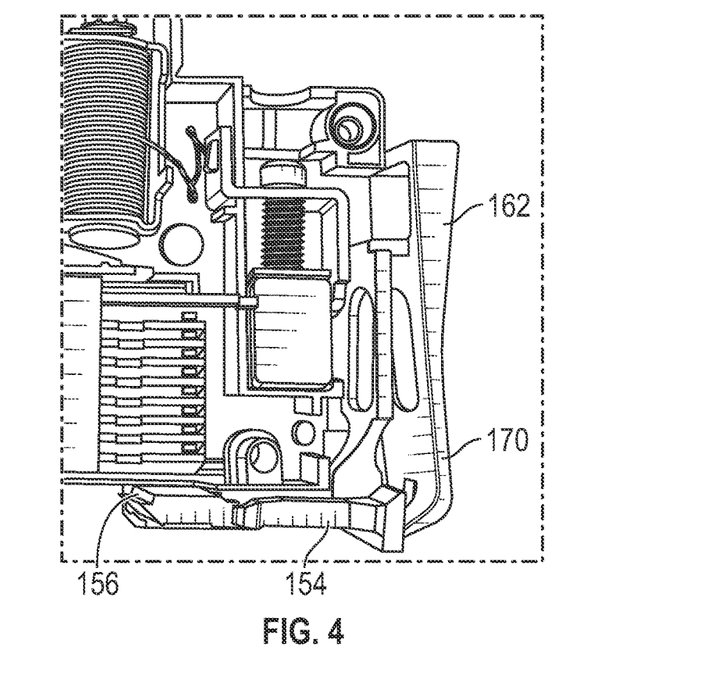
FIG. 4 is a side elevational view, partially broken away, of relevant portions of the circuit interrupter of FIGS. 1-3 shown in a DIN rail disengaging position.
Figure 5:
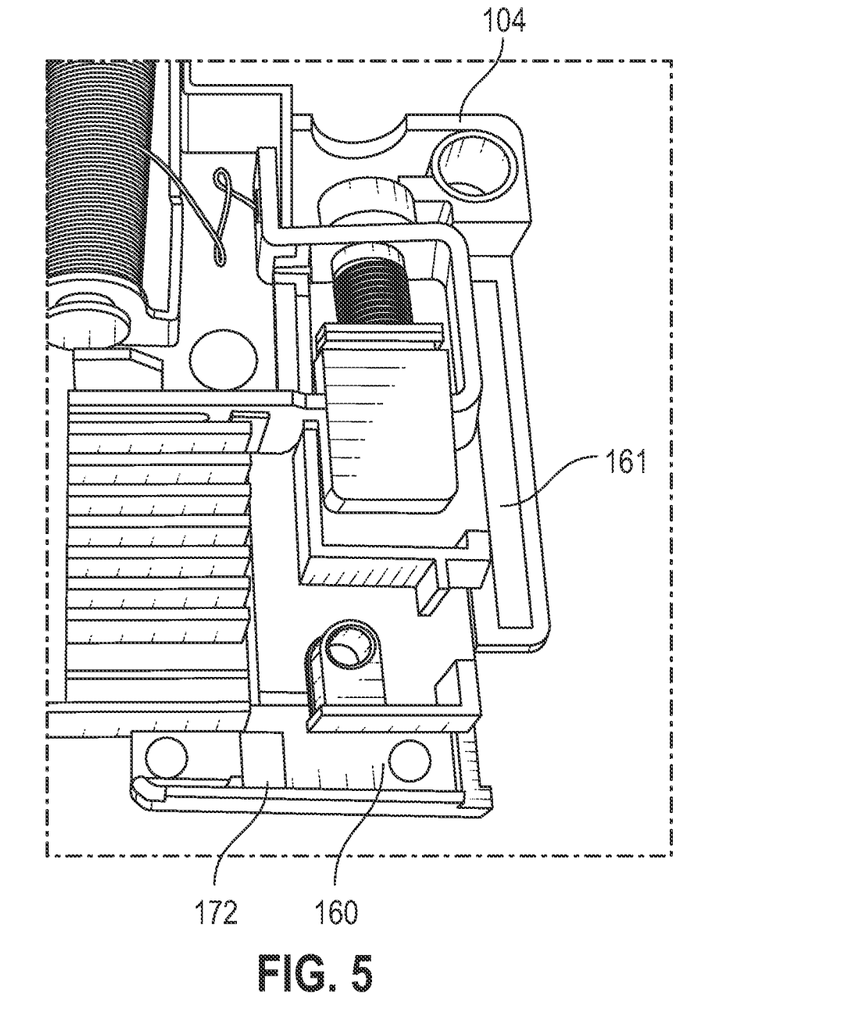
FIG. 5 is a side isometric view, partially broken away, of portions of the exemplary circuit interrupter constructed in accordance with the present invention as shown in FIGS. 1-4, illustrating in greater detail certain aspects of the present invention, including the interior surface of the housing.
Figure 6A:
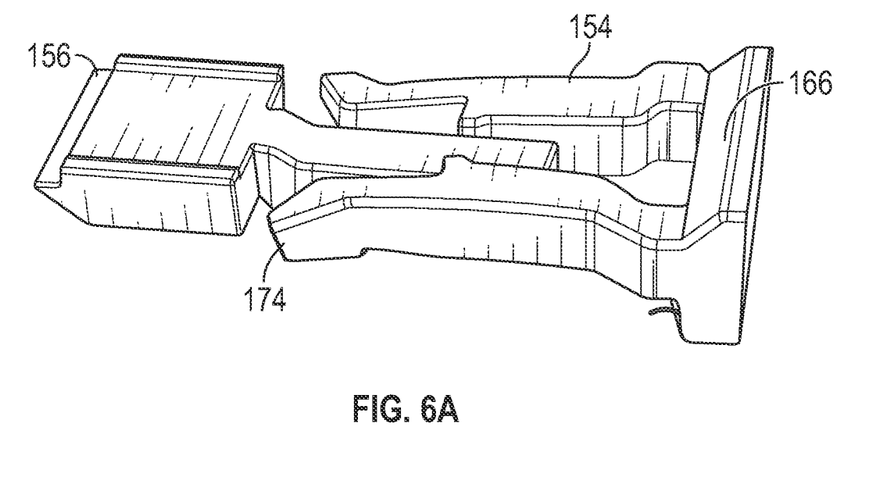
FIGS. 6A and 6B are side isometric and top plan views, respectively, of a portion of the exemplary circuit interrupter constructed in accordance with the present invention as shown in FIGS. 1-4, illustrating in greater detail certain aspects of the present invention, particularly, an engagement member thereof.
Figure 6B:
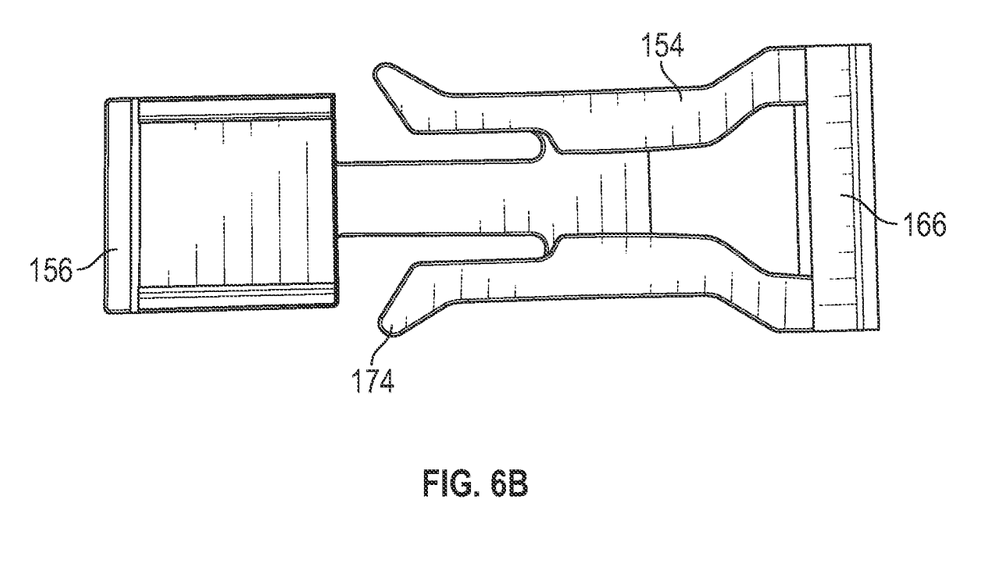
Figure 7A:
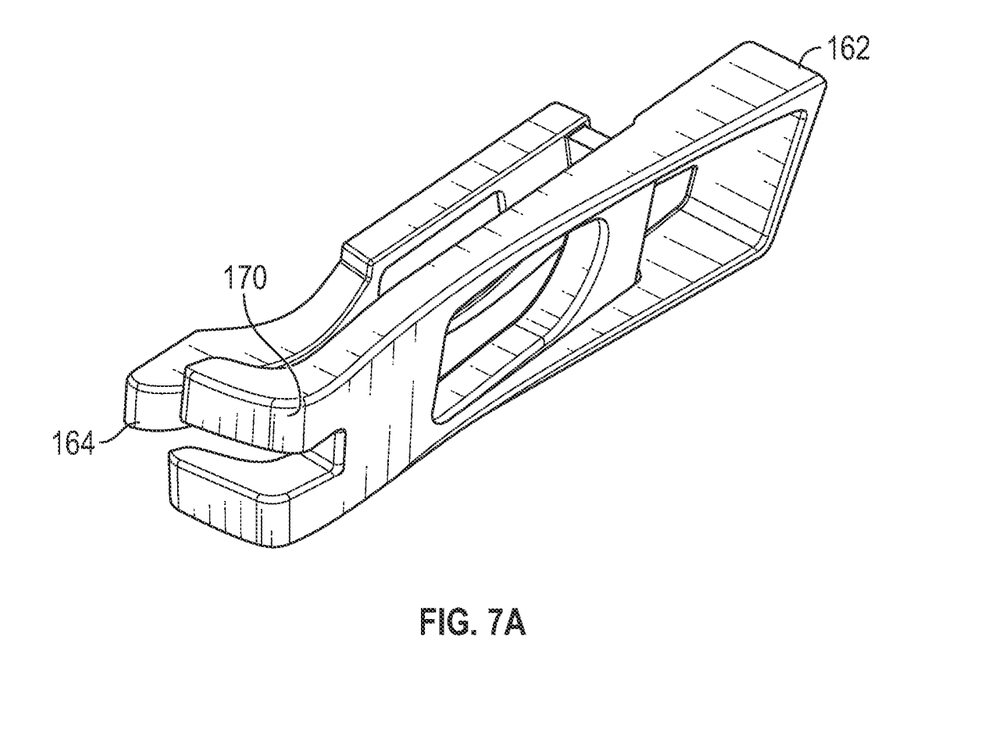
FIGS. 7A and 7B are side isometric views of a portion of the exemplary circuit interrupter constructed in accordance with the present invention as shown in FIGS. 1-4, illustrating in greater detail certain aspects of the present invention, particularly, an actuation member thereof.
Figure 7B:
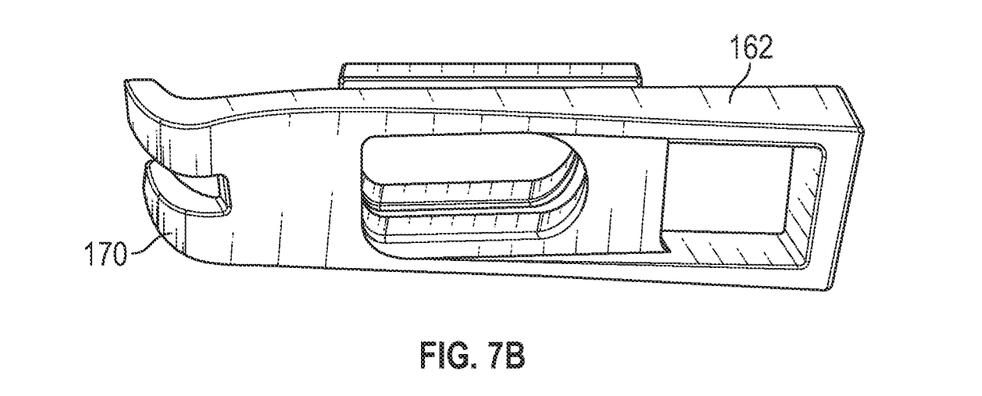

Movement of the actuation member (162) in the second plane (B) is translated into movement of the engagement member (154) in the first plane (A). More specifically, when the actuation member (162) is in the unactuated position, the engagement member (154) is in the engaged position (again, as shown in FIGS. 2 and 3), and when the actuation member (162) is moved to the actuated position, the engagement member (154) correspondingly moves to the disengaged position (again, as shown in FIG. 4).

This translation of movement of the actuation member (162) in one direction to movement of the engagement member (154) an another direction may be accomplished by providing the actuation member (162) with a ramp (164) and the engagement member (154) with a ramp (166). As best seen in FIG. 2, the ramps (164, 166) of the actuation member (162) and the engagement member (154) are arranged so as to slideably engage one another, and act to translate movement of the actuation member (162) in the second plane (B) into movement of the engagement member (154) in the first plane (A).

For example, when oriented as shown in FIG. 2, if the actuation member (162) is moved downward, the ramp (164) of the actuation member (162) would slide downward, thereby acting on the ramp (166) of the engagement member (154), and causing the engagement member (154) to move to the right.

In the exemplary embodiment, the second plane (B) is generally orthogonal to the first plane (A), and the ramps (164, 166) are both angled at approximately 45 degrees. Thus, movement of the actuation member (162) in the second plane (B) would cause generally the same amount of movement of the engagement member (154) in the first plane (A).

As discussed above, the circuit breaker (100) includes an outwardly facing exposed surface (106) through which the resetting mechanism (134) extends and/or is accessible by a user. The actuation member (162) is preferably also accessible from outwardly facing exposed surface (106) of the circuit breaker (100), and may be provided with a ribbed or textured end surface (168) to facilitate user manipulation.

Preferable, the engagement member (154) is biased toward the engaged position (shown in FIGS. 2 and 3). This may be achieved, for example, by providing the actuation member (162) with one or more elastically deformable legs (170) (two are shown in the Figures) that are caused to deform when the actuation member (162) is moved to the actuated position and the engagement member (154) moves to the disengaged position. This deformation can be seen by comparing FIGS. 3 and 4, with the legs (170) being shown in their relaxed state in FIG. 3, and with the legs (170) being flexed outwardly in FIG. 4. This deformation/flexing of the legs (170) biases the engagement member (154) toward the engaged position (i.e., the engagement member (154) is biased to the left with respect to the orientation shown in FIG. 4.

In the shown exemplary embodiment, the channel (160) of the housing (104) for receiving the engagement member (154) includes at least one recess (172) formed therein and the engagement member (154) includes at least one detent (174). Two recesses (172) and two corresponding detents (174) are provided in the illustrated exemplary embodiment. The recesses (172) in the housing (104) and the detents (174) on the engagement member (154) cooperate when the engagement member (154) is in the engaged position (shown in FIGS. 2 and 3) to urge the engagement member (154) to remain in the engaged position.

It is also preferable for the engagement member (154), when in the disengaged position (as shown in FIG. 4) to be urged to remain in the disengaged position in order to facilitate installation and removal of the circuit breaker (100) with respect to the DIN rail (102). This may be achieved by providing a frictional fit between components. For example, frictional forces between the channels (160, 161) formed in the housing (102) and at least one of the engagement member (162) and the actuation member (154) may urge the engagement member (162) to remain in the disengaged position.

The present invention thus provides a circuit interrupter having a DIN rail attachment arrangement that allows for secure mounting of electrical/electronic devices onto a DIN rail, while facilitating installation and intentional removal of the device from the DIN rail, that inhibits unintended disengagement of the device from the DIN rail, that is simple and convenient to use, and that employs a relatively small number of moving parts so as, consequently, to be less expensive, less prone to failure and require less maintenance than previously known designs.

Although the invention has been described with reference to a particular arrangement of parts, features and the like, these are not intended to exhaust all possible arrangements or features, and indeed many other modifications and variations will be ascertainable to those of skill in the art.

What is claimed is:
1. A circuit breaker comprising:
a housing within which components of the circuit breaker are disposed;

an engagement member being slideably carried by said housing such that said engagement member is moveable in a first plane between an engaged position and a disengaged position; and an actuation member being slideably carried by said housing and being moveable in a second plane, generally orthogonal to the first plane, between an actuated position and an unactuated position;

wherein said actuation member comprises a ramp and said engagement member comprises a ramp, the ramps of said actuation member and said engagement member slideably engaging one another, and acting to translate movement of said actuation member in the second plane into movement of said engagement member in the first plane, such that when said actuation member is in the unactuated position, said engagement member is in the engaged position, and when said actuation member is moved to the actuated position, said engagement member correspondingly moves to the disengaged position.

2. The circuit breaker of claim 1 wherein said housing has a notch disposed thereon and said engagement member has a notch disposed therein, the notch in said engagement member being positioned closer to the notch in said housing when said engagement member is in the engaged position than when said engagement member is in the disengaged position.

3. The circuit breaker of claim 1 wherein said housing comprises at least one recess and said engagement member comprises at least one detent, the at least one recess in said housing and the at least one detent on said engagement member cooperating when said engagement member is in the engaged position to urge said engagement member to remain in the engaged position.

4. The circuit breaker of claim 1 wherein said circuit breaker is adapted to be detachably connected to a DIN rail.

5. The circuit breaker of claim 1 further comprising a resetting mechanism adapted to reset the circuit breaker when tripped, the resetting mechanism being accessible from a first side of the circuit breaker, said actuation member also being accessible from the first side of the circuit breaker.

6. The circuit breaker of claim 1 wherein said engagement member is biased toward the engaged position.

7. The circuit breaker of claim 6 wherein said actuation member comprises at least one elastically deformable leg that is caused to deform when said actuation member is moved to the actuated position and said engagement member moves to the disengaged position, and wherein the at least one elastically deformable leg biases said engagement member toward the engaged position.

8. The circuit breaker of claim 1 wherein said housing defines channels therein for receiving said engagement member and said actuation member.

9. The circuit breaker of claim 8, wherein when said engagement member is in the disengaged position, frictional forces between the channels and at least one of the engagement member and the actuation member urge said engagement member to remain in the disengaged position.

10. A circuit interrupter adapted to be detachably connected to a rail system, said circuit interrupter comprising:

a housing within which components of the circuit interrupter are disposed, said housing having a notch disposed thereon adapted to receive a first leg of the rail system;

an engagement member having a notch disposed therein adapted to receive a second leg of the rail system, said engagement member being slideably carried by said housing such that the notch in said engagement member is moveable in a first plane toward and away from the notch in said housing between an engaged position wherein the notches in said engagement member and said housing are adapted to secure the rail system therebetween and a disengaged position, wherein the notch in said engagement member is moved away from the notch in said housing, such that the housing is adapted to be removeable from the rail system; and an actuation member being slideably carried by said housing and being moveable in a second plane, different than said first plane, between an actuated position and an unactuated position, movement of said actuation member in the second plane being translated into movement of said engagement member in the first plane;

wherein when said actuation member is in the unactuated position, said engagement member is in the engaged position, and when said actuation member is moved to the actuated position, said engagement member correspondingly moves to the disengaged position; and wherein said actuation member comprises a ramp and said engagement member comprises a ramp, the ramps of said actuation member and said engagement member slideably engaging one another, and acting to translate movement of said actuation member in the second plane into movement of said engagement member in the first plane.

11. The circuit interrupter of claim 10 wherein said housing comprises at least one recess and said engagement member comprises at least one detent, the at least one recess in said housing and the at least one detent on said engagement member cooperating when said engagement member is in the engaged position to urge said engagement member to remain in the engaged position.

12. The circuit interrupter of claim 10 wherein the second plane is generally orthogonal to the first plane.

13. The circuit interrupter of claim 10 wherein the rail system comprises a DIN rail.

14. The circuit interrupter of claim 10 wherein said engagement member is biased toward the engaged position.

15. The circuit interrupter of claim 14 wherein said actuation member comprises at least one elastically deformable leg that is caused to deform when said actuation member is moved to the actuated position and said engagement member moves to the disengaged position, and wherein the at least one elastically deformable leg biases said engagement member toward the engaged position.

16. The circuit interrupter of claim 10 wherein said housing defines channels therein for receiving said engagement member and said actuation member.

17. The circuit interrupter of claim 16, wherein when said engagement member is in the disengaged position, frictional forces between the channels and at least one of the engagement member and the actuation member urge said engagement member to remain in the disengaged position.

18. The circuit interrupter of claim 10 wherein the circuit interrupter comprises a circuit breaker.

19. The circuit interrupter of claim 18 further comprising a resetting mechanism adapted to reset the circuit breaker when tripped, the resetting mechanism being accessible from a first side of the circuit breaker, said actuation member also being accessible from the first side of the circuit breaker.

* * * * *